(12) United States Patent
Ho et al.

(10) Patent No.: US 7,786,695 B2
(45) Date of Patent: Aug. 31, 2010

(54) CONFIGURABLE BATTERY MANAGEMENT SYSTEM WITH EMBEDDED SRAM IN CHIP ARCHITECTURE

(75) Inventors: Chang-Yu Ho, Cyong-Lin Township, Hsinchu County (TW); Hung-An Hsu, Zhu-Dong Town (TW); Sei-Ching Yang, Zhu-Bei (TW)

(73) Assignee: Neotec Semiconductor Ltd., Hsingchu County (TW)

( * ) Notice: Subject to any disclaimer, the term of this patent is extended or adjusted under 35 U.S.C. 154(b) by 532 days.

(21) Appl. No.: 11/866,816

(22) Filed: Oct. 3, 2007

(65) Prior Publication Data

US 2008/0197809 A1    Aug. 21, 2008

(30) Foreign Application Priority Data

Feb. 16, 2007  (TW) ............................. 96106191 A

(51) Int. Cl.
*H01M 10/46*    (2006.01)
(52) U.S. Cl. ...................................................... 320/106
(58) Field of Classification Search ................. 320/106, 320/107, 112, 132, 149; 702/63, 64, 65
See application file for complete search history.

(56) References Cited

U.S. PATENT DOCUMENTS

| 5,541,489 | A | * | 7/1996 | Dunstan | ...................... 320/134 |
| 5,572,110 | A | * | 11/1996 | Dunstan | ...................... 320/106 |
| 5,600,230 | A | * | 2/1997 | Dunstan | ................ 340/636.13 |

* cited by examiner

*Primary Examiner*—Edward Tso
(74) *Attorney, Agent, or Firm*—Huntington IP Consulting Co., Ltd.

(57) ABSTRACT

A battery management system includes an external non-volatile memory and a battery management chip with embedded SRAM, CPU, ROM, and ROM_RAM encoder. The chip communicates with the non-volatile memory via standard protocols. While the battery management system is powered on or reset, a battery management program stored in the non-volatile memory is loaded to the embedded SRAM and the executed by CPU. As turning off this system, the program in the SRAM is then restored back the non-volatile memory. A battery protection IC is optionally embedded in the chip or externally connected with this chip to protect the battery from over-/under-voltage, over-current and short-circuit in both charge and discharge.

10 Claims, 1 Drawing Sheet

CONFIGURABLE BATTERY MANAGEMENT SYSTEM WITH EMBEDDED SRAM IN CHIP ARCHITECTURE

FIELD OF THE INVENTION

The present invention pertains to a battery management system, particularly to a battery management chip having embedded SRAM instead of flash memory therein to solve the problems of working voltage of the battery out of tolerance voltage range of flash memory thereof.

BACKGROUND OF THE INVENTION

For most of probable electric devices, battery is always a main power. However, due to a limited extent volume of the probable electric devices have, only a confined electrical capacity the battery is stored. Thus, to design a device with low power consumption has been longing for by the related product design engineer. Consequently, nowadays for those advance products, the probable devices having a battery management chip therein to manage battery related parameters such as remaining capacity, working environmental temperature, status of the charging/discharging, accumulation times, EDV 2 (End of discharge voltage) become main stream. A smart battery management chip further comprises the related parameter updating capability.

Generally, a battery management chip comprises microprocessor having a CPU, ROM, RAM and a battery protection integrated circuit. The ROM contains a battery management program of about remaining capacity monitoring and calculation, display, keyboard other than a booting program. The CPU fetches instructions of programs to monitor the remaining capacity of the battery and store the results into the RAM or show on the display. However, some of the battery related parameters based on for calculating the remaining capacity, charging saturation value of the battery are not invariable after using a period of time due to the chemistry decay or aging. And, ROM is incapable to bear burden to record the parameters and/or learning program. The flash memory seems to be a good candidate for data storage over 10 years without any power. Hence, a smart battery management chip internal embedded with a flash memory therein to record the learning program are demanded so as to retain the updating data for next time use.

With the advent of the semiconductor manufacture technology, nowadays, popular processes of device length are about 90 nm or beyond to achieve low operating voltage, low tolerance voltage of flash memory having is inferior to let it concurrent manufactured with other components of the battery management chip. Since the trend is toward more cells in one battery train so as to avoid embarrassed situation of breaking out and really breaking away from AC adapter while user operates the probable device in a predetermined time. As a result, the operation voltages for such configuration of the battery become rather high and so does the battery management chip. Typically, the voltage range is from 7.5V to 40V. Thus, to accommodated most of the clients, a battery management chip should have a working voltage range within 30V to 40V, which are out of range of current flash memory in the market.

As forgoing problems, an object of the present is thus to develop a battery management chip with new configuration to overcome aforementioned problems. The present invention thus disclose a configuration embedded with SRAM and cache SRAM along with a external flash memory module so that it can still retain the most newly parameter obtained from the learning program after the probable device is turned off.

SUMMARY OF THE INVENTION

An object of the present is to disclose a novel battery management system comprising a battery management chip connecting to an external nonvolatile memory. The battery management chip has an embedded SRAM therein rather than flash memory so that the manufacture process of battery management chip can be compatible with the logic processes. Nevertheless, the battery management chip can perform as it has flash memory therein. The battery management chip comprises SRAM, CPU, ROM, and ROM_RAM decoder. As a host device is turned on, the battery management chip loads contents of the external nonvolatile memory to the SRAM. The contents of the external nonvolatile memory are battery management program and related parameter data. As the host device is turned OFF, the contents of the SRAM are restored back to the non-volatile memory.

The battery management system further comprises an battery protected integrated circuit either internal contained or external connected to the battery management chip so as to prevent the battery from over current, over-discharge, and over charge.

Forgoing SRAM includes a cache RAM module and a general RAM to accelerate the data access speed and save power.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
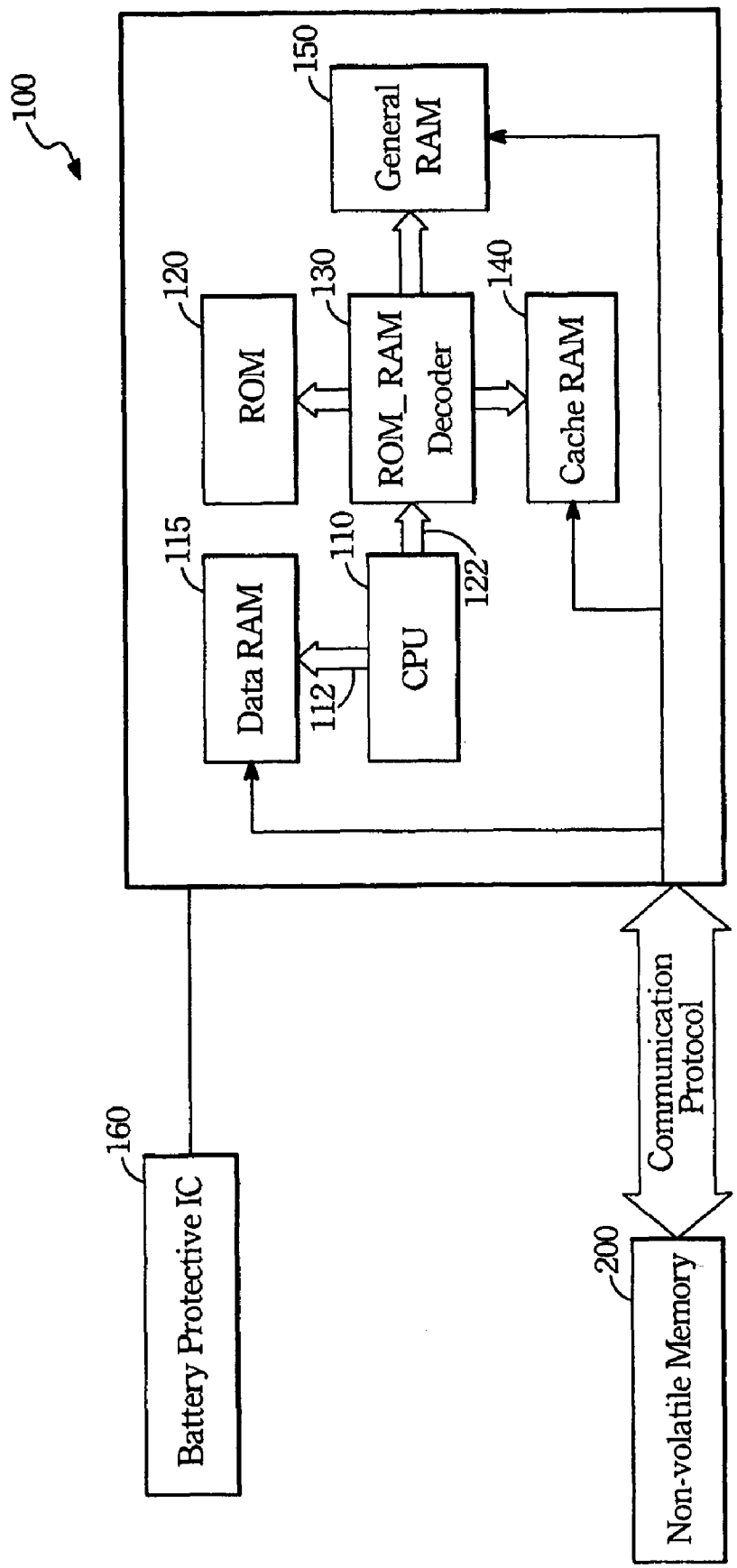
FIG. 1 is a function block diagram of the battery management system in accordance with the present invention.

The present invention is to provide a battery management chip with new configuration which is embedded with general static random access memory (SRAM) and cache SRAM without flash memory therein but still has the advantage of the flash memory.

Referring to FIG. 1, it shows function blocks of the battery management chip according to the present invention. The battery management chip comprises a CPU 110, data RAM 115, ROM 120, ROM_RAM decoder 130, cache RAM 140, and general RAM 150. ALL of above RAM 115, 140, 150 are SRAM type. In comparison with DRAM, SRAM requires less power to retain the data therein but provides higher potential tolerant ability.

Since all the above components do not involve any high voltage component, they thus can be fabricating through a general logic process.

The CPU 110 accesses the data code stored in the data RAM by means of first bus 112 and accesses the command codes in the ROM 120, general RAM 150, and cache RAM 140 through the second bus 122 and ROM_RAM decoder 130. The first bus 112 is provided for parameter data and address to pass through and the second bus 122 is provided for command bus and address bu to pass through s. The battery protective integrated circuit 160 also can be fabricated through logic process. Thus battery protective integrated circuit 160 can be formed in terms of logic process and be placed either in the battery management chip 100 or be individual chip connected with the battery management chip 100.

The general RAM 150 and cache RAM 130 get along with the external non-volatile memory 200 are set up to simulate the functions of flash memory, which is knows to have data storage and access commands capability. Furthermore, the RAM includes the general RAM 150 and cache RAM to store the commands can save the power consumption and increase the access rate. Since the cache RAM 140 stores those commands accessed frequently or nearby time and general RAM 150 save those commands less accessed. Thus the general RAM 150 need not to be kept enable at all time.

The operation method for the present system according to the present invention is as follows:

Firstly, the battery management chip 100 electrically connected with an external nonvolatile memory 200, which is built with a battery management program, learning program, and related parameters such as aging factor, series number of manufacturer, remaining capacity maximum capacity, EDV (end of discharge voltage), EDV2, environmental temperature, overcharge condition, and over-discharge condition. The nonvolatile memory 200 can be a thumb disk, or flash memory connected through USB interface to a host (not shown) having the battery management chip 100. The above battery management program, learning program, and related parameters can also be stored in the floppy disk, rewritable optical disk or compact disk electrically connected to the host through data transfer interface such as ATA, IDE, SATA, SCSI, or USB, internet or WLAN (wireless local area network) or LAN. The host cab be a probable electronic device such as notebook, handheld computer, PDA (personal digital secretary), handheld MP3 or MP4, or digital still camera.

The instruction codes contented in ROM 120 includes the protocol for the battery management chip 100 communicated with the external nonvolatile memory 220. When the host is powered on, the instruction codes stored in the ROM 120 are executed by the CPU 110. According to the communication protocol, the instruction codes stored in the nonvolatile memory 200 are then loaded into the cache RAM 140 and the general RAM 150 the parameter data codes stored in the nonvolatile memory 200 are loaded into the Data RAM 115. Thereafter, the RAM 115, 140, 150 in the battery management chip 100 contain the battery management program, learning program, and related parameters. The battery management chip thus can monitor and measure the remaining charges in the battery and record related parameters. All of the instruction codes in the cache RAM 140, general RAM 140 and ROM 120 are decoded by means ROM_RAM decoder 130.

As the host powered off, the remaining charges in the battery provided electrical power for the host so that the CPU executes the instruction codes in the ROM so that the contents in the cache RAM 140, general RAM 150 and the data codes in the DATA RAM 115 are restored into the original non-volatile memory 220. Hence, even the HOST is shut off, the recently updated parameters and learning program are kept safe.

To ensure the remaining charges are sufficient to restore aforementioned instruction codes and parameter data codes into the non-volatile memory 200, backup charges such as 10% of the total amount charges are always reserved and be precedent charged while charging the battery so as to avoid affecting the forgoing restored operations of the host.

The benefits of the present invention:
(1) The fabricating processes of the embedded SRAM are compatible to the standard logic processes and the others portions of the battery management chip. The SRAM is to be worked as the chip having flash memory. Thus the design cycle time of the chip can be reduced.
(2) Since the nonvolatile memory are external so that the battery management program can be more readily updated or expanded or even dynamically exchanged according to the customer requirements than updating a firmware memory or flash memory.
(3) The cache RAM provides fast access speed and power save.
(4) The battery management chip can also include the battery protective integrate circuit therein.
(5) No special high voltage processes are required to forming the chip according to the present invention.

As is understood by a person skilled in the art, the foregoing preferred embodiment of the present invention is an illustration of the present invention rather than limiting thereon. It is intended to cover various modifications and similar arrangements included within the spirit and scope of the appended claims, the scope of which should be accorded the broadest interpretation so as to encompass all such modifications and similar structure.

What is claimed is:

1. A battery management system, comprising:
a battery management chip, having embedded SRAM module, CPU, ROM therein;
an external non-volatile memory module having a battery management program stored therein and said battery management program thereafter being down loaded into said SRAM in terms of a communication protocol while a host being turned ON or reset and restored said battery management program backed into said non-volatile memory module while said host being turned OFF so that said battery management chip can perform battery management.

2. The battery management system according to claim 1 further comprising at least one of parameters selected from the group consisting of aging factor, series number of manufacturer, remaining capacity, maximum capacity, EDV (end of discharge voltage), overcharge condition, and over-discharge condition.

3. The battery management system according to claim 1 wherein said SRAM module comprises a general RAM module, a cache RAM module and a Data RAM module.

4. The battery management system according to claim 1 wherein said general RAM module and said cache RAM module are provided for storing instruction codes of said battery management program and a Data RAM module is provided for storing data codes of said program battery management.

5. The battery management system according to claim 1 wherein said communication protocol is stored in said ROM for said CPU to execute.

6. The battery management system according to claim 1 further comprises a ROM-RAM decoder for said instruction codes before passing to said CPU.

7. The battery management system according to claim 1 wherein said external non-volatile memory module is selected from a group consisting of flash memory, floppy disk, rewritable compact disk.

8. The battery management system according to claim 1 wherein said battery management chip further comprising a battery protective integrated circuit therein to prevent the battery managed by said battery management chip from over current, over discharge and overcharge.

9. The battery management system according to claim 1 wherein said battery management chip further comprising a battery protective integrated circuit therein to prevent the battery managed by said battery management chip from over current, over discharge and overcharge.

10. The battery management system according to claim 1 further comprising a battery protective integrated circuit externally connected to said battery management chip so as to prevent the battery managed by said battery management chip from over current, over discharge and overcharge.

* * * * *